(12) United States Patent
Yu et al.

(10) Patent No.: US 8,670,716 B2
(45) Date of Patent: Mar. 11, 2014

(54) APPARATUS AND METHOD FOR SCHEDULING IN A MULTI-HOP RELAY WIRELESS COMMUNICATION SYSTEM

(75) Inventors: Tak-Ki Yu, Yongin-si (KR); Yung-Soo Kim, Seongnam-si (KR); Myeon-Kyun Cho, Seongnam-si (KR); Chan-Ho Min, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 897 days.

(21) Appl. No.: 12/283,562

(22) Filed: Sep. 12, 2008

(65) Prior Publication Data

US 2009/0075587 A1 Mar. 19, 2009

(30) Foreign Application Priority Data

Sep. 19, 2007 (KR) .................. 10-2007-0095075

(51) Int. Cl.
*H04B 1/00* (2006.01)

(52) U.S. Cl.
USPC ........... 455/63.1; 455/7; 455/67.13; 455/450; 455/452.1; 455/452.2; 370/315

(58) Field of Classification Search
USPC ................ 455/63.1, 67.13, 450–452.1, 452.2
See application file for complete search history.

(56) References Cited

U.S. PATENT DOCUMENTS

| | | | |
|---|---|---|---|
| 6,018,661 A | 1/2000 | Raith et al. | |
| 6,243,371 B1 | 6/2001 | Chawla et al. | |
| 7,738,835 B2 * | 6/2010 | Oh et al. | 455/7 |
| 2008/0031197 A1 * | 2/2008 | Wang et al. | 370/331 |
| 2008/0070510 A1 * | 3/2008 | Doppler et al. | 455/69 |
| 2008/0165881 A1 * | 7/2008 | Tao et al. | 375/267 |

FOREIGN PATENT DOCUMENTS

| KR | 10-2007-0038875 | 4/2007 |
|---|---|---|
| KR | 10-2007-0078449 | 8/2007 |

OTHER PUBLICATIONS

International Search Report dated Mar. 31, 2009 in connection with PCT Patent Application No. PCT/KR2008/005510.

* cited by examiner

*Primary Examiner* — Raymond Dean (57) ABSTRACT

A multi-hop relay wireless communication system is provided. A base station (BS) includes a communication unit for receiving information on a received signal level and information on an interference node from mobile stations (MSs), and a scheduler for classifying a type of each MS by using the received signal level information and the interference node information and for performing differentiated scheduling according to the MS type.

22 Claims, 10 Drawing Sheets

APPARATUS AND METHOD FOR SCHEDULING IN A MULTI-HOP RELAY WIRELESS COMMUNICATION SYSTEM

CROSS-REFERENCE TO RELATED APPLICATION(S) AND CLAIM OF PRIORITY

This application claims the benefit under 35 U.S.C. §119 (a) of a Korean patent application filed in the Korean Intellectual Property Office on Sep. 19, 2007 and assigned Serial No. 2007-95075, the entire disclosure of which is hereby incorporated by reference.

TECHNICAL FIELD OF THE INVENTION

The present invention relates to a multi-hop relay wireless communication system. More particularly, the present invention relates to an apparatus and method for scheduling in a multi-hop relay wireless communication system.

BACKGROUND OF THE INVENTION

In a next generation communication system, also known as the 4th Generation (4G) communication system, researches are actively conducted to ensure mobility of a mobile station (MS) and flexibility of a wireless network and also to provide further effective services in a wireless environment where traffic distribution and call demands change rapidly. A multi-hop relay communication system employing a data transfer method using a relay station (RS) is taken into consideration as one of the 4 G communication systems.

The use of the RS provides an advantage of throughput improvement and cell coverage extension. However, since signal transmission is repeated twice (i.e., communication between a base station (BS) and the RS and communication between the RS and an MS), more resources are consumed than when using a single-hop wireless communication system. Therefore, resource reuse is necessary when communication is made between the RS and the MS.

When signals are simultaneously transmitted and received by a plurality of RSs, intra-cell interference occurs inside a cell, which leads to deterioration in system performance. In addition, inter-cell interference occurs between neighbor cells when MSs are located in a boundary area of the neighbor cells. Therefore, there is a need for a method for preventing intra-cell interference between RSs within a cell and inter-cell interference between neighbor cells.

SUMMARY OF THE INVENTION

To address the above-discussed deficiencies of the prior art, it is a primary object of the present invention to address at least the above-mentioned problems and/or disadvantages and to provide at least the advantages described below. Accordingly, an aspect of the present invention is to provide an apparatus and method for mitigating intra-cell interference and inter-cell interference in a multi-hop relay wireless communication system.

Another aspect of the present invention is to provide an apparatus and method for interference-mitigation scheduling in a multi-hop relay wireless communication system.

Another aspect of the present invention is to provide an apparatus and method for allocating resources by using a different scheme according to a location of a mobile station (MS) in a multi-hop relay wireless communication system.

Another aspect of the present invention is to provide an apparatus and method for allocating resources by grouping MSs in a multi-hop relay wireless communication system.

In accordance with an aspect of the present invention, a base station (BS) apparatus in a multi-hop relay wireless communication system is provided. The apparatus includes a communication unit for receiving information on a received signal level and information on an interference node from MSs, and a scheduler for classifying a type of each MS by using the received signal level information and the interference node information and for performing differentiated scheduling according to the MS type.

In accordance with another aspect of the present invention, an MS apparatus in a multi-hop relay wireless communication system is provided. The apparatus includes a measurer for measuring a received signal level from a BS and a relay station (RS) by using a received signal, a processor for determining a serving node and an interference node and for generating control information comprising information on the interference node information and information on the received signal level, and a communication unit for transmitting the control information.

In accordance with another aspect of the present invention, a scheduling method of a BS in a multi-hop relay wireless communication system is provided. The method includes receiving information on a received signal level and information on an interference node from MSs, classifying a type of each MS by using the received signal level information and the interference node information, and performing differentiated scheduling according to the MS type.

In accordance with another aspect of the present invention, a method of feeding back interference information of an MS in a multi-hop relay wireless communication system is provided. The method includes measuring a received signal level from a BS and an RS by using a received signal, determining a serving node and an interference node, and transmitting the control information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a scheduling technique for reducing interference in a multi-hop relay wireless communication system will be described.

Figure 1:
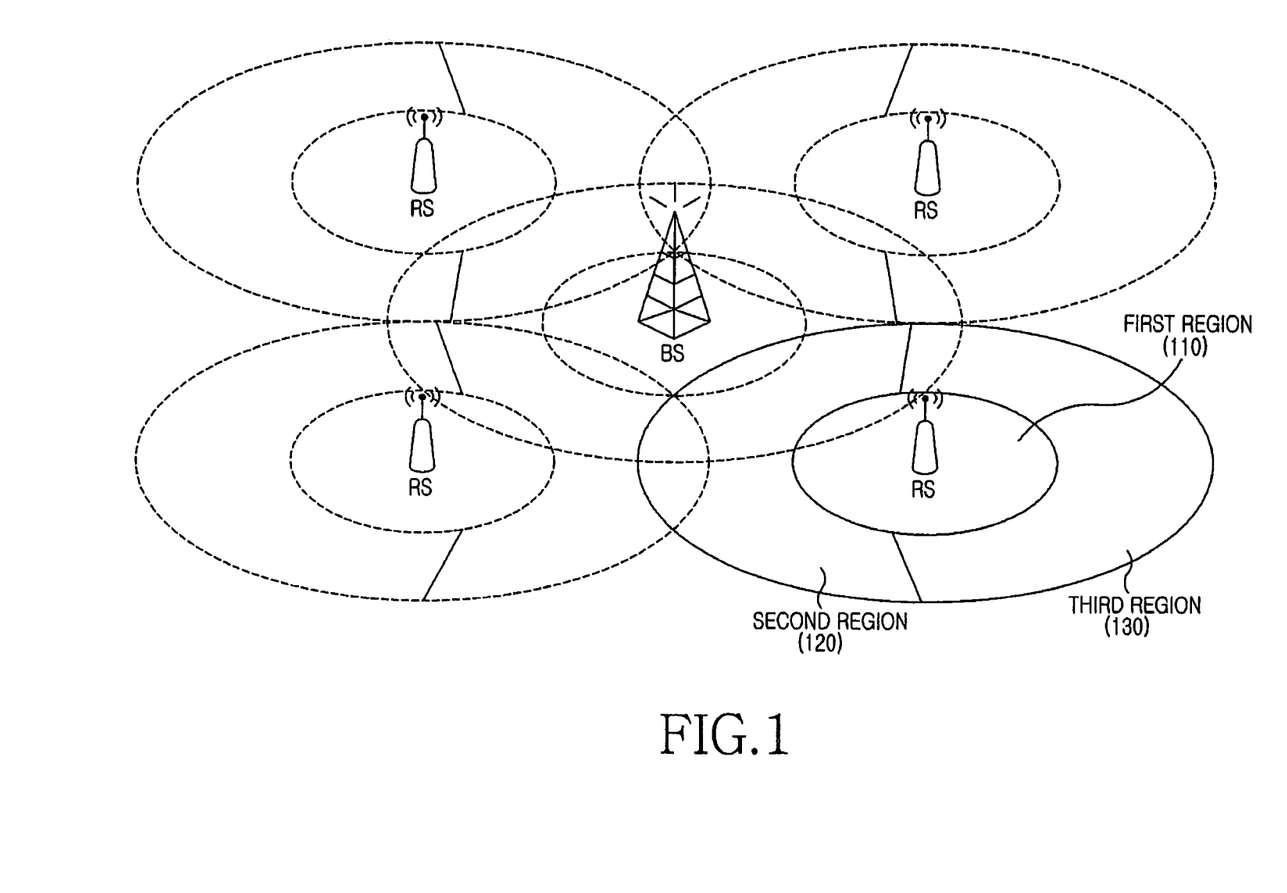
FIG. 1 illustrates cell regions in a multi-hop relay wireless communication system according to an exemplary embodiment of the present invention.

In a multi-hop relay wireless communication system of the present invention, as shown in FIG. 1, a coverage of each relay station (RS) is divided into a plurality of regions, and scheduling is performed by grouping mobile stations (MSs) located in each region. Referring to FIG. 1, a first region 110 is a region around a specific RS, and is not interfered with any other RSs. A second region 120 is a boundary region between the specific RS and its neighbor RS or between the specific RS and a base station (BS), and is interfered with the neighbor RS or the BS. A third region 130 is a boundary region between the specific RS and its neighbor cell, and is interfered with the neighbor cell. Hereinafter, an MS located in the first region 110 is referred to as a 'type-1 MS', an MS located in the second region 120 is referred to as a 'type-2 MS', and an MS located in the third region 130 is referred to as a 'type-3' MS. In addition, as shown in FIG. 1, a coverage determined by one BS and a plurality of RSs is referred to as a cluster. From the perspective of one node, a cell of another node in the same cluster is referred to as an internal cell.

The BS of the present invention classifies an MS type according to the regions divided as shown in FIG. 1. The BS applies interference-mitigation scheduling to the type-1 MS and the type-2 MS, and applies interference-avoidance scheduling to the type-3 MS by using reserved resources. The BS may classify the MS type according to a received signal strength (or level). That is, each MS measures received signal levels of preambles and reference signals from the BS and the RSs, and feeds back the measured signal levels to the BS. In this case, the MS may reuse a scanning result for a handover instead of performing additional measurement for the type classification. Equation 1 below shows an example of the type classification performed by the BS when the received signal level information is fed back from the MS.

$$\text{type-1: } \frac{P_S}{\sum_{j=1}^{i} P_I^j} > Th_1, \quad \text{[Eqn. 1]}$$

$$\text{type-2: } \frac{P_S}{\sum_{j=1}^{L} P_{I\text{-}intra}^j} > Th_2,$$

$$\text{type-3: } \frac{P_S}{\sum_{j=1}^{L-M} P_{I\text{-}inter}^j} > Th_3.$$

In Equation 1 above, $P_S$ denotes a received signal level from a serving node, L denotes the number of remaining nodes included in an active set other than the serving node, $P_{I\text{-}intra}^j$ denotes a received signal level from a $j^{th}$ internal cell, $P_{I\text{-}inter}^j$ denotes a received signal level from a $j^{th}$ external cell, and $Th_k$ denotes a type-k threshold.

The BS classifies the MSs according to the MS type, and applies a scheduling scheme based on the MS type. The BS applies a resource reuse scheduling to the type-1 MS and the type-2 MS by considering interference. In other words, the BS applies suitable scheduling so that interference does not occur even when a plurality of RSs simultaneously transmit signals by using the same resource. The type-1 MS not experiencing interference with the BS or other RSs are scheduled by the BS to reuse all resource regions. The type-2 MS experiencing interference with an internal cell is scheduled by the BS to avoid interference. The type-3 MS experiencing interference with an external cell is scheduled by the BS by using resource regions predetermined between the BS and its neighbor BS.

Figure 2:
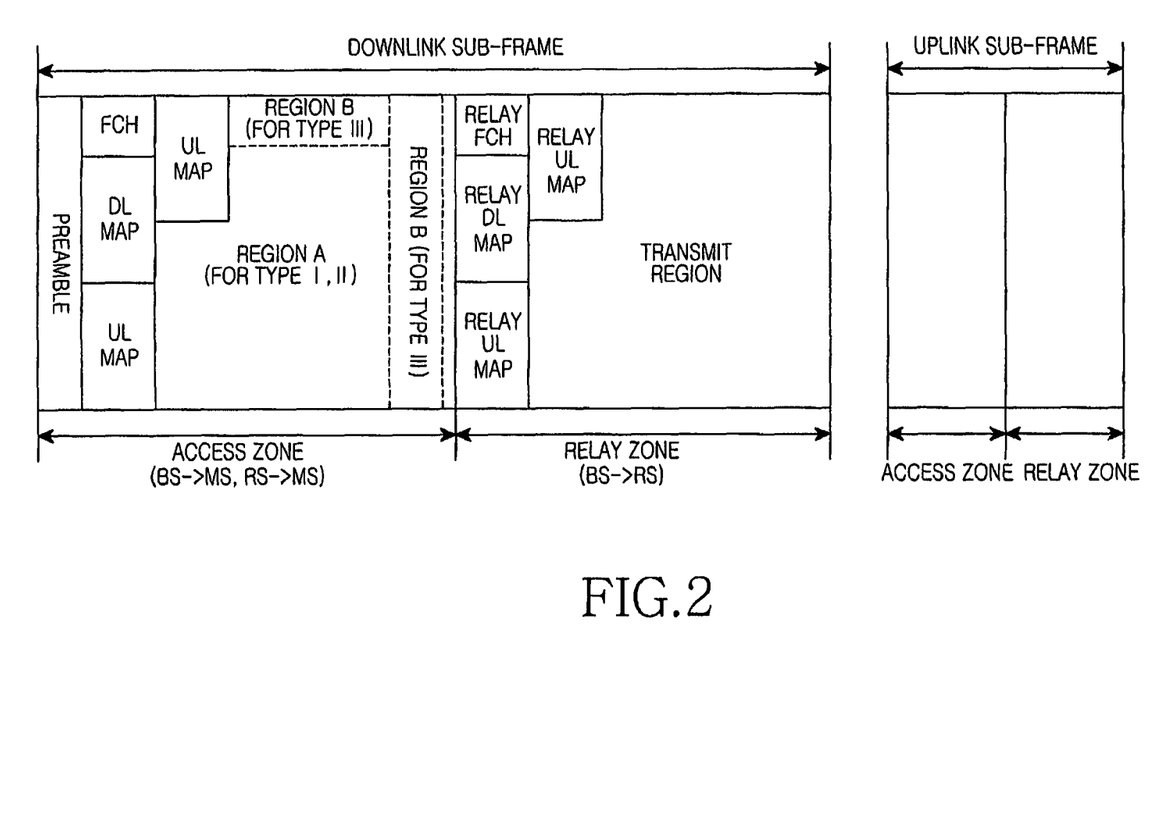
FIG. 2 illustrates a frame structure in a multi-hop relay wireless communication system according to an exemplary embodiment of the present invention.

FIG. 2 illustrates an example of a downlink frame in which resource regions available for each MS type are divided. Referring to FIG. 2, the frame is divided into a downlink sub-frame and an uplink sub-frame. Each sub-frame is divided into an access zone for communication between a BS and an MS and communication between the BS and an RS and a relay zone for communication between the RS and the MS. The access zone of the downlink sub-frame includes a preamble, a frame control header (FCH), a downlink (DL) MAP, an uplink (UL) MAP, and a downlink traffic region. The downlink traffic region is divided into a region A and a region B. In FIG. 2, a location of the region B may vary depending on intention of a system designer.

A resource allocation process of the BS will now be described with reference to the frame structure of FIG. 2. The BS allocates resources within the region A to the type-1 MS and the type-2 MS, and allocates resources within the region B to the type-3 MS.

Regarding the region B, in order to avoid interference to the type-3 MS, the use of some of the resources within the region B are prohibited for the purpose of avoiding interference with a neighbor cell. That is, when allocating the resources in the region B, the BS allocates resources within a prohibited region of the neighbor cell. Therefore, some resources of the prohibited region B are predetermined between BSs, and the resources of the region B are reused by a plurality of clusters.

Figure 3A:
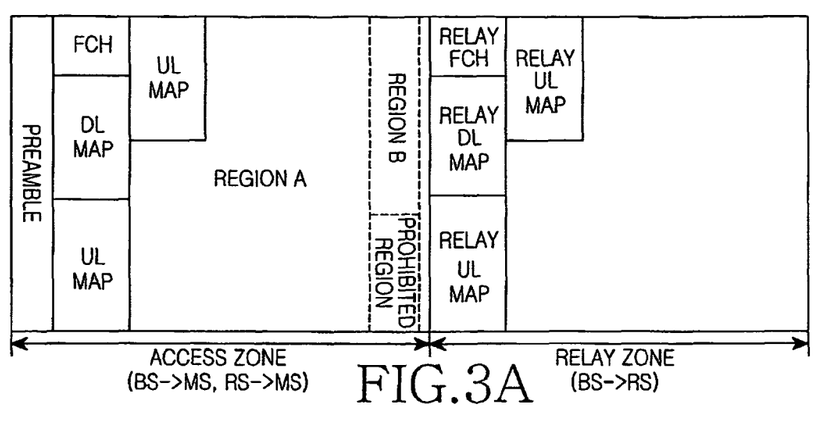
FIGS. 3A to 3C illustrate examples of frame usage by base stations (BSs) in a multi-hop relay wireless communication system according to an exemplary embodiment of the present invention.
Figure 3B:
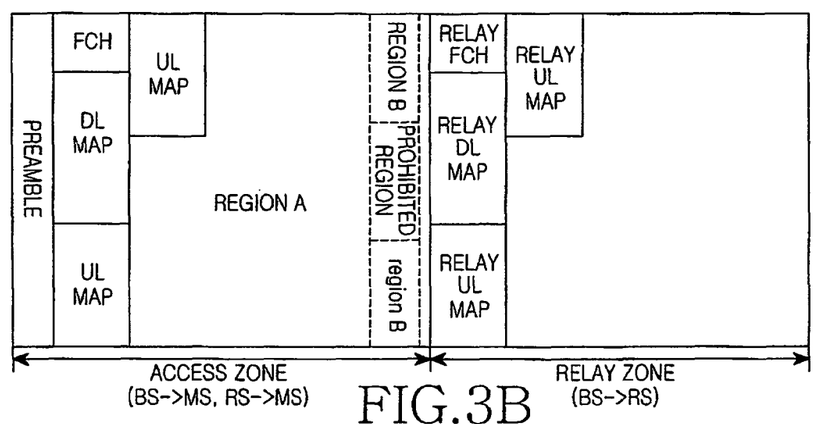
Figure 3C:
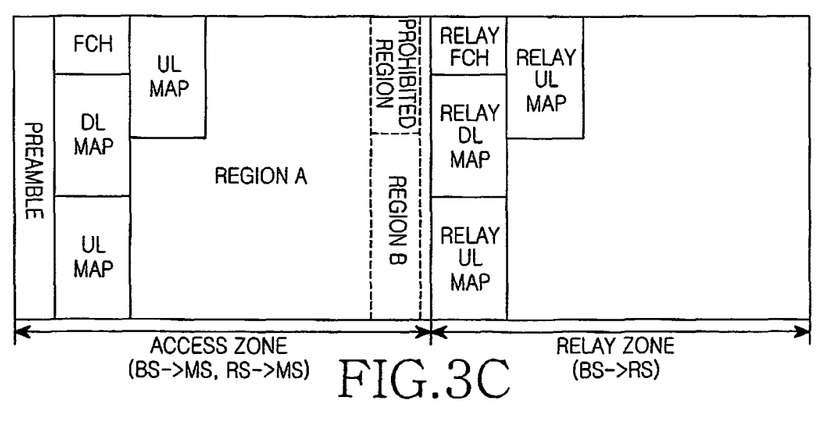

For example, if 3 clusters are used, for each cluster, the prohibited region in the region B is configured as shown in FIGS. 3A-3C.

Regarding the region A, the BS performs grouping on MSs capable of reusing resources and included in the type-1 and type-2 MSs, and allocates the resources in an exclusive manner to each group. For the grouping, the BS selects one MS while updating an MS pool. The MS pool denotes a list of grouping-candidate MSs. To select the MS, the BS uses a table describing a received signal level and a connection relation between MSs and nodes in a cluster. An example of the table is shown in Table 1 below.

TABLE 1

| Received Signal Level | RS1 | BS | RS2 | RS3 |
|---|---|---|---|---|
| MS1 | — | 7(S) | — | — |
| MS2 | — | −9(I) | 6(S) | −1(I) |
| MS3 | 5(S) | −5(I) | — | — |
| MS4 | — | −3(I) | 1(S) | — |
| MS5 | — | −3(I) | 3(S) | — |
| MS6 | — | — | — | 2(S) |

In Table 1 above, '−' denotes a state in which there is no mutual interference, 'k(S)' denotes a connection relation in a state in which a received signal level is k, and 'k(I)' denotes a interference relation in a state in which a received signal level is k.

In Table 1 above or the like, the BS determines a specific metric to be used as a reference in selection, and selects an MS having a maximum value. A detailed configuration of the metric differs according to exemplary embodiments of the present invention. A scheduling metric is used in a first exemplary embodiment of the present invention. A scheduling metric based on a reuse set is used in a second exemplary embodiment of the present invention.

In the determination of the scheduling metric, the BS determines the scheduling metric as expressed by Equation 2 below by using received signal level information that is fed back from the MS. In this case, different expressions are used according to scheduling schemes.

$$SM_k = SINR_k : \text{maximum } SINR \text{ scheme,} \quad \text{[Eqn. 2]}$$

$$SM_k(i) = \frac{R_k(i)}{T_k^\alpha(i)} : \text{proportional fairness scheme,}$$

$$T_k(i+1) = \begin{cases} \beta T_k(i): \text{non-scheduled at time } i \\ \beta T_k(i) + (1-\beta)R_k(i): \text{scheduled at time } i. \end{cases}$$

In Equation 2 above, $SM_k$ denotes a scheduling metric of a $k^{th}$ MS, $SINR_k$ denotes a signal to interference and noise ratio (SINR), $T_k(i)$ denotes an average data rate of the $k^{th}$ MS at a time i, α denotes a scaling constant, and β denotes a forgetting constant.

The BS sorts scheduling metrics determined using Equation 2 above. Thereafter, the BS selects an MS having a greatest scheduling metric and removes MSs having an interference relation with the selected MS from an MS pool. The same process is repeated until all MSs are selected or removed, and thus the BS finally determines a scheduling MS group. According to the first exemplary embodiment of the present invention, if it is assumed that the maximum SINR scheme is used as the scheduling scheme and the received signal level of Table 1 above is SINR, a grouping process is performed using Table 1 above in the following manner. First, the BS selects an MS1 having a greatest scheduling metric. Then, the BS removes an MS2, an MS3, an MS4, and an MS5 each having an interference relation with the MS1. Thereafter, the BS selects an MS6 having a greatest scheduling metric from the remaining MSs. Since all MSs are removed or selected, the BS determines the MS1 and the MS6 as one group. Thereafter, the BS performs the grouping process on the remaining MS2, MS3, MS4, and MS5 according to the same scheme and thus determines other groups.

In addition to using only the scheduling metric, group determination can be made by using both the scheduling metric and the reuse set. For reuse set information, the BS uses a reuse-based scheduling metric as shown in Equation 3 below in a process of sorting and selecting MSs.

$$f(SM_k, RM) = SM_k + N_{BS-RS}(RM) \times \sum_{j=1}^{N_{RS-pool}} Avg[SM^j]. \quad \text{[Eqn. 3]}$$

In Equation 3 above, $SM_k$ denotes a scheduling metric of a $k^{th}$ MS, RM denotes a reuse matrix (RM), f(•) denotes a reuse-based scheduling metric, $N_{BS-RS}(RM)$ denotes an average number of BSs or RSs that can be additionally selected when the $k^{th}$ MS is selected, and $Avg[SM^j]$ denotes an average value of scheduling metrics of MSs dependent on a $j^{th}$ RS. In the RM, an interference relation between the BS and the RS is represented with '0' and a reuse relation is represented with '1'. In addition to '0' and '1', other forms of expressions are also possible to represent the interference relation and the reuse relation.

According to the second exemplary embodiment of the present invention, if it is assumed that the maximum SINR scheme is used as the scheduling scheme and the received signal level of Table 1 above is SINR, a grouping process is performed using Table 1 above in the following manner. The BS calculates reuse-based scheduling metrics of all MSs according to Equation 3 above, and sorts the MSs according to the reuse-based scheduling metrics. Then, the BS selects an MS2 having a greatest reuse-based scheduling metric. The BS removes an MS1, an MS4, an MS5, and an MS6 each having an interference relation with the MS2. Thereafter, the BS selects an MS3 having a greatest reuse-based scheduling metric from the remaining MSs. Since all MSs are removed or selected, the BS determines the MS2 and the MS3 as one group. Thereafter, the BS performs the grouping process on the remaining MS1, MS4, MS5, and MS6 according to the same scheme and thus determines other groups.

Now, structures and operations of a BS and an MS for performing the aforementioned scheduling will be described with reference to the accompanying drawings.

Figure 4A:
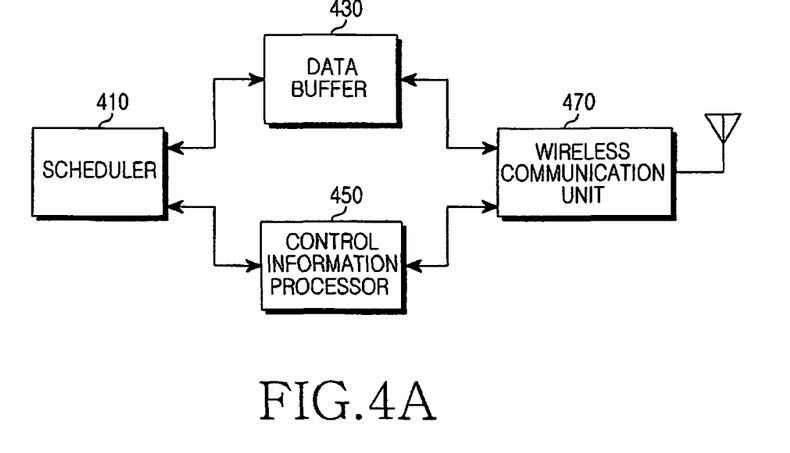
FIGS. 4A and 4B are a block diagram of a BS in a multi-hop relay wireless communication system according to an exemplary embodiment of the present invention.
Figure 4B:
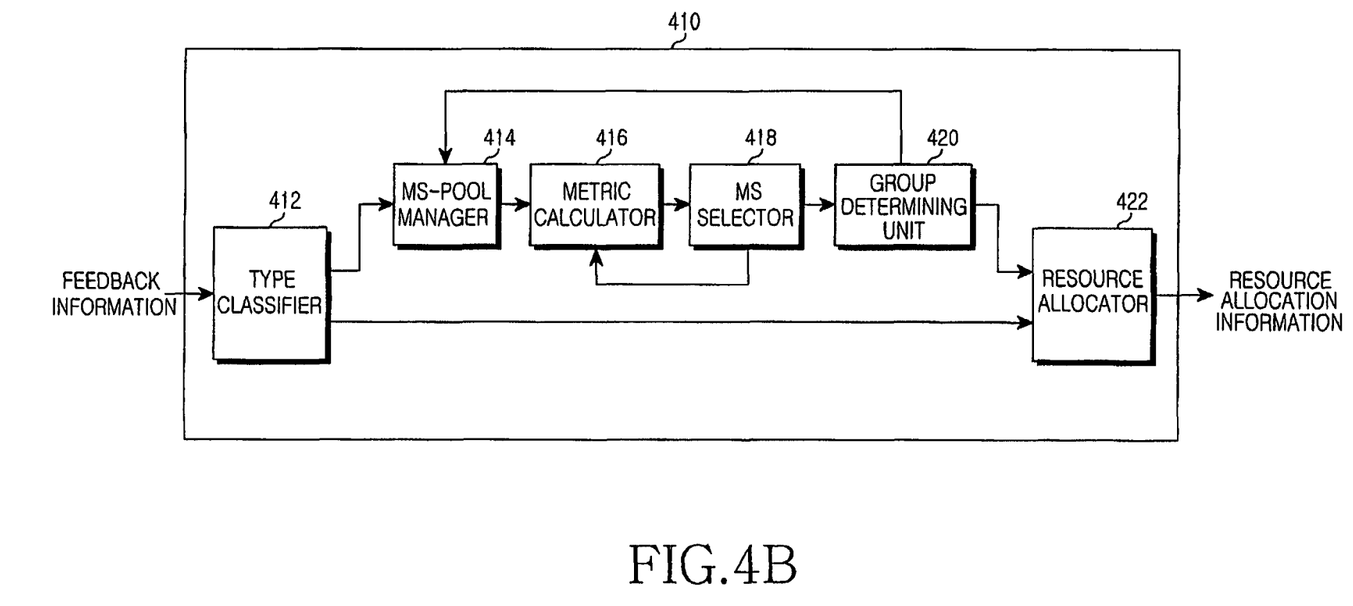

FIGS. 4A and 4B are block diagrams of a BS in a multi-hop relay wireless communication system according to an exemplary embodiment of the present invention. More specifically, FIG. 4A is a block diagram of a BS, and FIG. 4B is a block diagram of a scheduler of the BS.

Referring to FIG. 4A, the BS includes a scheduler 410, a data buffer 430, a control information processor 450, and a wireless communication unit 470.

The scheduler 410 performs scheduling for communication of MSs and RSs existing within a cluster. Detailed functions of the scheduler 410 will be described below with reference to FIG. 4B. The data buffer 430 stores data exchanged with the RSs and the MSs and outputs the data to the wireless communication unit 470 according to the scheduling result of the scheduler 410. The control information processor 450 generates and processes control information exchanged with the RSs and the MSs. For example, the control information processor 450 evaluates received signal level information and interference node information fed back from the MSs and provides the evaluated information to the scheduler 410. In addition, the control information processor 450 generates a MAP message indicating a resource assignment result and provides the MAP message to the wireless communication unit 470. The received signal level may be an SINR, a signal to noise ratio (SNR), a carrier to interference and noise ratio (CINR), and so forth.

The wireless communication unit 470 performs conversion between an information bit-stream and a radio frequency (RF) signal. For example, when using an orthogonal frequency division multiplexing (OFDM) scheme, the wireless communication unit 470 coverts the information bit-stream into a coded bit-stream by encoding the information bit-stream. In addition, the wireless communication unit 470 converts the modulated bit-stream into complex symbols by modulating the coded bit-stream. Then, the wireless communication unit 470 maps the complex symbols onto subcarriers, generates an OFDM symbol through an inverse fast Fourier transform (IFFT) operation, up-coverts the OFDM symbol into an RF signal, and transmits the RF signal through an antenna.

Referring to FIG. 4B, the scheduler 410 includes a type classifier 412, an MS-pool manager 414, a metric calculator 416, an MS selector 418, a group determining unit 420, and a resource allocator 422.

The type classifier 412 classifies an MS type by using received signal level information fed back from the MSs. The MS type indicates in which region the MS is located among the regions divided as shown in FIG. 1. For example, the MS type may be classified according to Equation 1 above. The type classifier 412 provides type-3 MS information to the resource allocator 422, and provides type-1 MS information and type-2 MS information to the MS-pool manager 414.

The MS-pool manager 414 configures an MS pool by receiving the type-1 MS information and the type-2 MS information from the type classifier 412. When the MS pool is initialized, the MS-pool manager 414 configures the MS pool so that all type-1 and type-2 MSs are included in a selection candidate list. Whenever each group is determined, the MS pool is reconfigured by excluding MSs belonging to the determined group.

The metric calculator 416 calculates a metric of each MS included in the MS pool. The metric varies depending on exemplary embodiments of the present invention. According to a first exemplary embodiment of the present invention, the metric calculator 416 calculates a scheduling metric of each MS. For example, the scheduling metric is calculated as shown in Equation 2 above. In addition, according to the first exemplary embodiment, the metric calculator 416 calculates a metric of each MS in an initial stage of scheduling. According to a second exemplary embodiment of the present invention, the metric calculator 416 calculates a scheduling metric based on a reuse group of each MS. For example, the reuse-based scheduling metric is calculated as shown in Equation 3 above. In addition, according to the second exemplary embodiment, the metric calculator 416 re-calculates a metric of each MS whenever each MS is selected.

The MS selector 418 sorts the MSs according to the metric calculated by the metric calculator 416, and selects an MS having a greatest metric. Further, the MS selector 418 removes MSs having an interference relation with the selected MS, and re-selects an MS having a greatest metric from the remaining MSs. The MS selector 418 repeats the selecting and removing until all MSs are removed or selected, and provides information on the selected MS to the group determining unit 420. In this case, according to the second exemplary embodiment of the present invention, the MS selector 418 provides information on the selected MS to the metric calculator 416 whenever each of the MSs is selected, and receives new metrics of the remaining MSs.

The group determining unit 420 determines the MSs selected by the MS selector 418 as one group. Whenever each group is determined, if there is no ungrouped MS, the group determining unit 420 provides group information to the resource allocator 422. Otherwise, if there is an ungrouped MS, the group determining unit 420 provides information on the ungrouped MS to the MS-pool manager 414.

The resource allocator 422 evaluates type-3 MS information provided from the type classifier 412, and allocates resources within a predetermined region to the type-3 MS. For example, the resource allocator 422 allocates resources within the region B of FIG. 2 to the type-3 MS. However, the resource allocator 422 allocates resources within a prohibited region of a neighbor cell to the type-3 MS. In addition, the resource allocator 422 evaluates the group information provided from the group determining unit 420 and allocates resources in an exclusive manner to each group. In this case, the group determining unit 420 allocates resources within the remaining regions other than the region for the type-3 MS. For example, the resource allocator 422 allocates resources within the region A of FIG. 2 to the grouped MSs.

Figure 5:
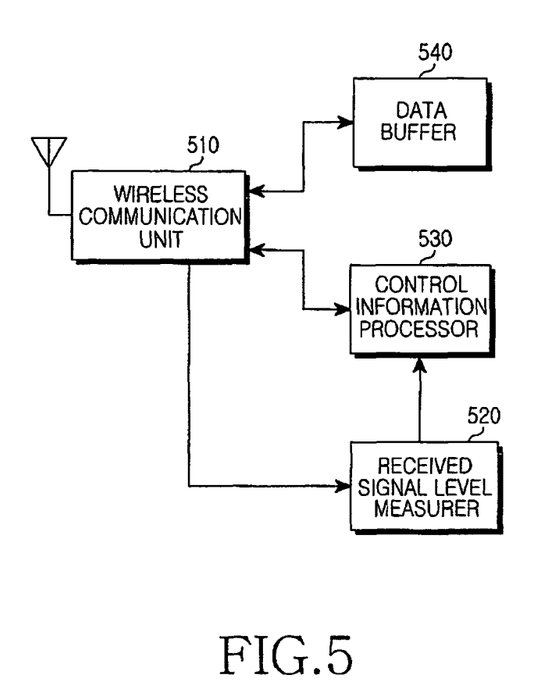
FIG. 5 is a block diagram of a mobile station (MS) in a multi-hop relay wireless communication system according to an exemplary embodiment of the present invention.

FIG. 5 is a block diagram of an MS in a multi-hop relay wireless communication system according to an exemplary embodiment of the present invention.

Referring to FIG. 5, the MS includes a wireless communication unit 510, a received signal level measurer 520, a control information processor 530, and a data buffer 540.

The wireless communication unit 510 performs conversion between an information bit-stream and an RF signal. For example, when using an OFDM scheme, the wireless communication unit 510 converts the information bit-stream into a coded bit-stream by encoding the information bit-stream. In addition, the wireless communication unit 510 and converts the modulated bit-stream into complex symbols by modulating the coded bit-stream. Then, the wireless communication unit 510 maps the complex symbols onto subcarriers, generates an OFDM symbol through an IFFT operation, up-coverts the OFDM symbol into an RF signal, and transmits the RF signal through an antenna.

The received signal level measurer 520 measures a received signal level from a BS and an RS within a cluster by using received preambles and reference signals. The received signal level may be an SINR, an SNR, a CINR, and so forth. The control information processor 530 generates and analyzes control information to be exchanged with the BS. In particular, according to the present invention, the control information processor 530 determines a serving node and an interference node by using a value obtained by measuring the received signal level from the nodes within the cluster. Then, the control information processor 530 generates interference node information and received signal level information to be fed back to the BS and provides the generated information to the wireless communication unit 510. Accordingly, the wireless communication unit 510 transmits the interference node information and the received signal level information to the BS. The data buffer 540 temporarily stores data transmitted and received.

Figure 6:
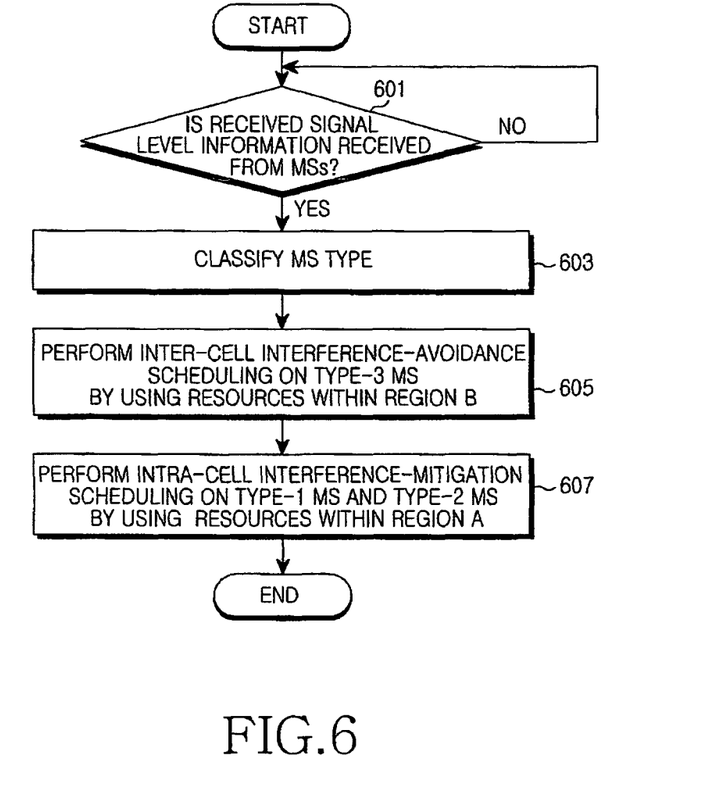
FIG. 6 is a flowchart illustrating a scheduling process of a BS in a multi-hop relay wireless communication system according to an exemplary embodiment of the present invention.

FIG. 6 is a flowchart illustrating a scheduling process of a BS in a multi-hop relay wireless communication system according to an exemplary embodiment of the present invention.

Referring to FIG. 6, the BS determines whether received signal level information is received from MSs in step 601. The received signal level may be an SINR, an SNR, a CINR, and so forth.

In step 603, according to an MS type, the BS classifies MSs to be scheduled. The MS type indicates in which region the MSs are located among the regions divided as shown in FIG. 1. For example, the MS type may be classified according to Equation 1 above.

After classifying the MSs according to the MS type, proceeding to step 605, the BS allocates resources within a region B to type-3 MSs to avoid interference with a neighbor cell. Herein, the BS allocates resources within a prohibited region of the neighbor cell to the type-3 MSs.

In step 607, the BS allocates resources within a region A to type-1 and type-2 MSs to mitigate interference. In other words, the BS performs grouping on the MSs according to an interference relation, and allocates resources in an exclusive manner to each group. In this case, different metrics are used in the grouping according to exemplary embodiments of the present invention, which will be described below in detail with reference to FIGS. 7 and 8.

Figure 7:
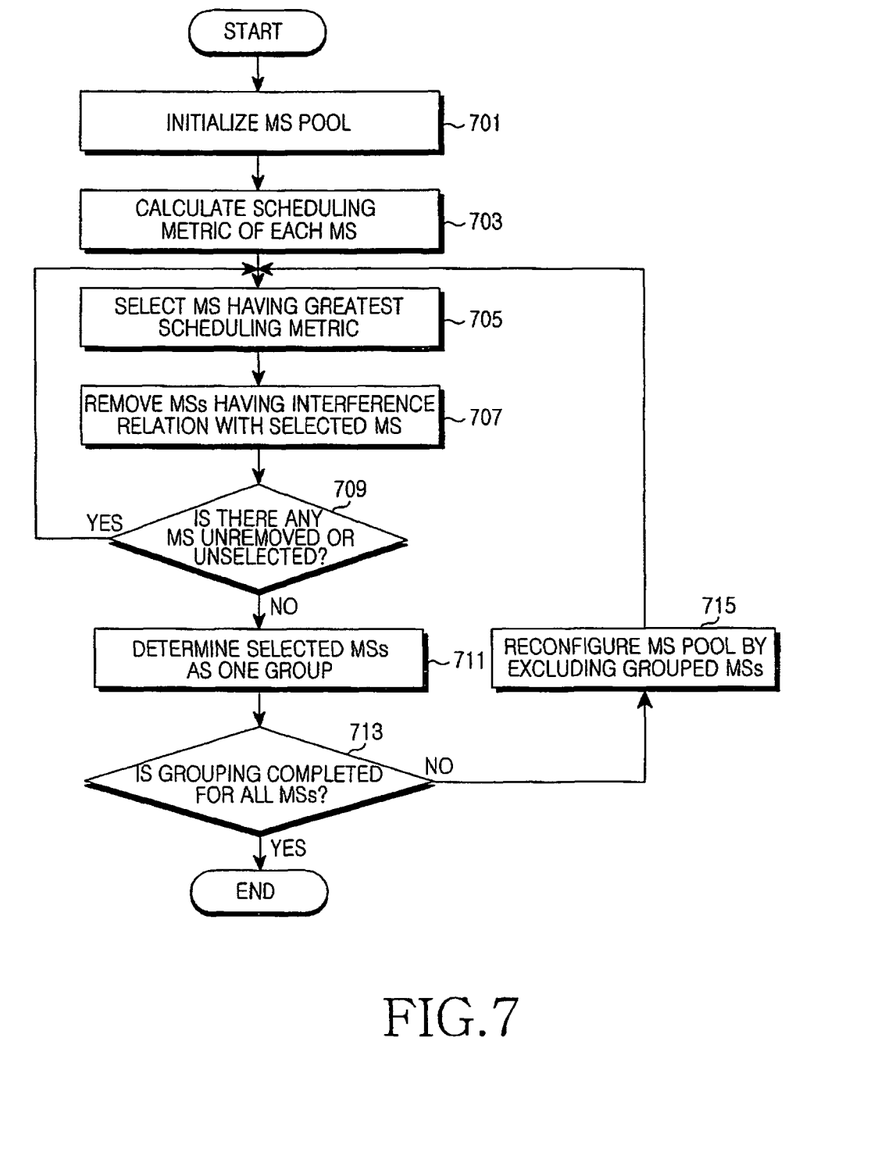
FIG. 7 is a flowchart illustrating an MS-grouping process of a BS in a multi-hop relay wireless communication system according to a first exemplary embodiment of the present invention.

FIG. 7 is a flowchart illustrating an MS-grouping process of a BS in a multi-hop relay wireless communication system according to a first exemplary embodiment of the present invention.

Referring to FIG. 7, the BS initializes an MS pool in step 701. That is, the BS configures the MS pool so that all MSs to be scheduled are included in a selection candidate list.

In step 703, the BS calculates a scheduling metric of each MS. For example, the scheduling metric is calculated according to Equation 2 above.

In step 705, the BS selects an MS having a greatest scheduling metric.

In step 707, the BS removes MSs having an interference relation with the selected MS. Removing of the MSs means that the MSs are excluded so that they are not included in the same group with the selected MS.

In step 709, the BS determines whether there is an MS which is unremoved or unselected. That is, the BS determines whether there is an additional MS to be selected. If there is the MS which is unremoved or unselected, the procedure returns to step 705.

Otherwise, if there is no MS which is unremoved or unselected, proceeding to step 711, the BS determines the MSs selected currently from the MS pool as one group.

In step 713, the BS determines whether grouping is completed for all MSs to be scheduled. That is, the BS determines whether all MSs to be scheduled are grouped.

If the grouping is not completed, proceeding to step 715, the BS reconfigures the MS pool so that only MSs remaining after removing the grouped MSs are included in the selection candidate list. Then, the procedure returns to step 705.

Otherwise, if the grouping is completed, the procedure of FIG. 7 ends.

Figure 8:
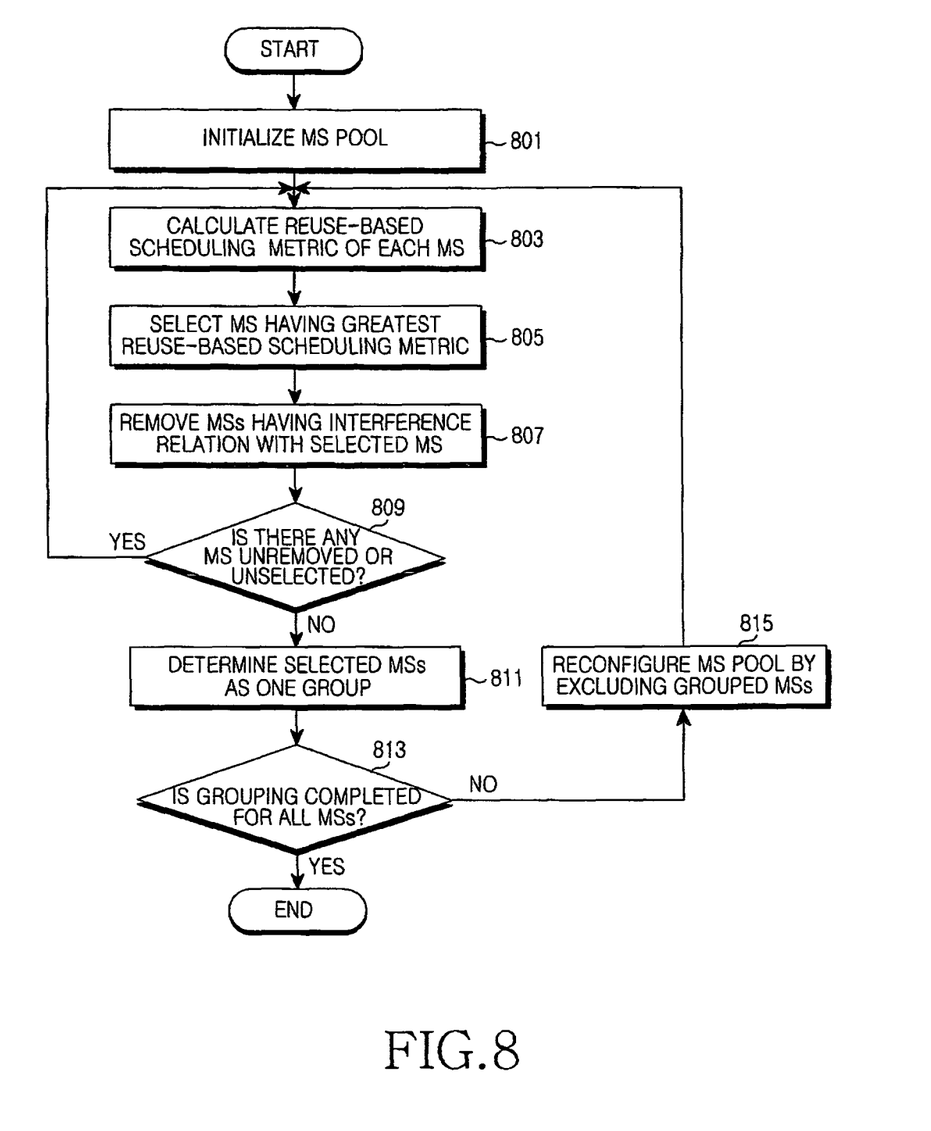
FIG. 8 is a flowchart illustrating an MS-grouping process of a BS in a multi-hop relay wireless communication system according to a second exemplary embodiment of the present invention.

FIG. 8 is a flowchart illustrating an MS-grouping process of a BS in a multi-hop relay wireless communication system according to a second exemplary embodiment of the present invention.

Referring to FIG. 8, the BS initializes an MS pool in step 801. That is, the BS configures the MS pool so that all MSs to be scheduled are included in a selection candidate list.

In step 803, the BS calculates a reuse-based scheduling metric of each MS. For example, the reuse-based scheduling metric is calculated according to Equation 3 above.

In step 805, the BS selects an MS having a greatest reuse-based scheduling metric.

In step 807, the BS removes MSs having an interference relation with the selected MS. Removing of the MSs means that the MSs are excluded so that they are not included in the same group with the selected MS.

In step 809, the BS determines whether there is an MS which is unremoved or unselected. That is, the BS determines whether there is an additional MS to be selected. If there is the MS which is unremoved or unselected, the procedure returns to step 803.

Otherwise, if there is no MS which is unremoved or unselected, proceeding to step 811, the BS determines the MSs selected currently from the MS pool as one group.

In step 813, the BS determines whether grouping is completed for all MSs to be scheduled. That is, the BS determines whether all MSs to be scheduled are grouped.

If the grouping is not completed, proceeding to step 815, the BS reconfigures the MS pool so that only MSs remaining after removing the grouped MSs are included in the selection candidate list. Then, the procedure returns to step 803.

Otherwise, if the grouping is completed, the procedure of FIG. 8 ends.

Figure 9:
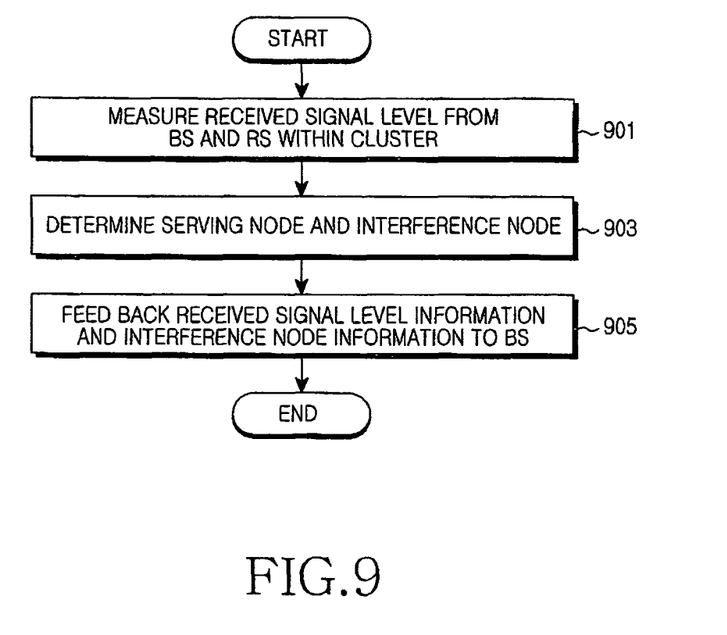
FIG. 9 is a flowchart illustrating a process of feeding back interference information by an MS in a multi-hop relay wireless communication system according to an exemplary embodiment of the present invention.

FIG. 9 is a flowchart illustrating a process of feeding back interference information by an MS in a multi-hop relay wireless communication system according to an exemplary embodiment of the present invention.

Referring to FIG. 9, the MS measures a received signal level from a BS and an RS within a cluster by using received preambles and reference signals in step 901. The received signal level may be an SINR, an SNR, a CINR, and so forth.

In step 903, the MS determines a serving node and an interference node by using a value obtained by measuring the received signal level from the nodes within the cluster.

In step 905, the MS transmits the interference node information and the received signal level information to the BS.

According to exemplary embodiments of the present invention, MSs are classified according to an MS type and scheduling is performed using a different scheme according to the MS type in a multi-hop relay wireless communication system. Therefore, intra-cell interference between RSs within a cell and inter-cell interference between neighbor cells can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a base station (BS) in a multi-hop relay wireless communication system, the BS apparatus comprising:
 a communication unit configured to receive signal level information and interference node information from a plurality of mobile stations (MSs); and
 a scheduler configured to classify a type of each mobile station by using the received signal level information and the interference node information, and perform a differentiated scheduling according to the mobile station type, at least one of the plurality of MSs located in a coverage area of a serving relay station (RS) that belongs to a cluster of the BS, wherein the mobile station type is classified into one of a number of predefined types, the predefined types comprising:
  a first type (type-1) in which the mobile station is located in a region around the serving RS and is not interfered by any other RSs,
  a second type (type-2) in which the mobile station is located in one of a first boundary region between the serving RS and an interfering neighbor RS and a second boundary region between the serving RS and the BS, and
  a third type (type-3) in which the mobile station is located in a boundary region between the serving RS and an interfering neighbor cell.

2. The apparatus of claim 1, wherein the scheduler comprises:
  a classifier configured to classify the type of each mobile station; and
  an allocator configured to allocate one or more resources of a first region of a sub-frame in an exclusive manner to a group of at least one type-1 mobile station and at least one type-2 mobile station, and allocate one or more resources of a second region of the sub-frame to at least one type-3 mobile station.

3. The apparatus of claim 2, wherein the classifier is further configured to classify the mobile station type according to:

$$\text{type-1: } \frac{P_S}{\sum_{j=1}^{L} P_I^j} > Th_1,$$

$$\text{type-2: } \frac{P_S}{\sum_{j=1}^{L} P_{I\text{-}intra}^j} > Th_2,$$

$$\text{type-3: } \frac{P_S}{\sum_{j=1}^{L-M} P_{I\text{-}inter}^j} > Th_3,$$

where $P_s$ denotes a received signal level from a serving node, L denotes a number of remaining nodes included in an active set other than the serving node, $P_{I\text{-}intra}^j$ denotes a received signal level from a $j^{th}$ internal cell, $P_{I\text{-}inter}^j$ denotes a received signal level from $j^{th}$ external cell, and $Th_k$ denotes a type-k threshold.

4. The apparatus of claim 2, wherein the allocator is further configured to allocate the one or more resources within a predetermined region, which is prohibited from use in a cell neighboring to the type-3 mobile station and which is included in the second region, to at least one type-3 mobile station.

5. The apparatus of claim 2, wherein the scheduler further comprises:
  a manager configured to configure a mobile station pool for at least one type-1 mobile station and at least one type-2 mobile station so that at least one remaining mobile station to be scheduled other than at least one grouped mobile station is included in a selection candidate list;
  a calculator configured to calculate a metric of each mobile station included in the mobile station pool;
  a selector configured to select a mobile station having a greatest metric and remove at least one mobile station having an interference relation with the selected mobile station; and
  a determining unit configured to determine at least one mobile station selected by the selector as one group.

6. The apparatus of claim 5, wherein the selector is further configured to repeat at least one of selecting and removing for the remaining mobile stations that are neither selected nor removed until all mobile stations included in the mobile station pool are one of removed and selected.

7. The apparatus of claim 6, wherein the calculator is further configured to calculate the metric according to one of the following equations:

$$SM_k = SINR_k : \text{maximum} SINR \text{ scheme},$$

$$SM_k(i) = \frac{R_k(i)}{T_k^\alpha(i)} : \text{proportional fairness scheme},$$

$$T_k(i+1) = \begin{cases} \beta T_k(i) : \text{non-scheduled at time } i \\ \beta T_k(i) + (1-\beta)R_k(i) : \text{scheduled at time } i, \end{cases}$$

where $SM_k$ denotes a scheduling metric of a $k^{th}$ mobile station, $SINR_k$ denotes a signal to interference and noise ratio (SINR), $T_k(i)$ denotes an average data rate of the $k^{th}$ mobile station at a time i, $\alpha$ denotes a scaling constant, and $\beta$ denotes a forgetting constant.

8. The apparatus of claim 7, wherein the calculator is further configured to calculate the metric of each mobile station in an initial stage of scheduling in which the mobile stations to be scheduled are determined.

9. The apparatus of claim 6, wherein the calculator is further configured to calculate the metric by using a scheduling metric of each mobile station according to a corresponding scheduling scheme and by using a reuse matrix (RM) representing an interference relation between the base station and the serving RS.

10. The apparatus of claim 9, wherein the calculator is further configured to calculate the metric according to:

$$f(SM_k, RM) = SM_k + N_{BS-RS}(RM) \times \sum_{j=1}^{N_{RS-pool}} Avg[SM^j],$$

where $SM_k$ denotes the scheduling metric of a $k^{th}$ mobile station, RM denotes a reuse matrix (RM), f(•) denotes a reuse-based scheduling metric, $N_{BS-RS}(RM)$ denotes an average number of at least one of base stations and RSs that can be additionally selected when the $k^{th}$ mobile station is selected, and $Avg[SM^j]$ denotes an average value of scheduling metrics of mobile stations dependent on a $j^{th}$ RS.

11. The apparatus of claim 10, wherein the calculator is further configured to calculate the metric of each mobile station when the each mobile station is selected.

12. A method of a base station (BS) in a multi-hop relay wireless communication system, the method comprising:
  receiving signal level information and interference node information from a plurality of mobile stations (MSs);
  classifying a type of each mobile station by using the received signal level information and the interference node information; and
  performing a differentiated scheduling according to the mobile station type, at least one of the plurality of MSs located in a coverage area of a serving relay station (RS) that belongs to a cluster of the BS,
  wherein the mobile station type is classified into one of a number of predefined types, the predefined types comprising:

a first type (type-1) in which the mobile station is located in a region around the serving RS and is not interfered by any other RSs, a second type in (type-2) which the mobile station is located in one of a first boundary region between the serving RS and an interfering neighbor RS and a second boundary region between the serving RS and the BS, and a third type (type-3) in which the mobile station is located in a boundary region between the serving RS and an interfering neighbor cell.

13. The method of claim 12, wherein performing the differentiated scheduling comprises:

allocating one or more resources of a first region of a sub-frame in an exclusive manner to a group of at least one type-1 mobile station and at least one type-2 mobile station; and allocating one or more resources of a second region of the sub-frame to at least one type-3 mobile station.

14. The method of claim 13, wherein the mobile station type is classified according to:

$$\text{type-1: } \frac{P_S}{\sum_{j=1}^{L} P_I^j} > Th_1,$$

$$\text{type-2: } \frac{P_S}{\sum_{j=1}^{L} P_{I\text{-}intra}^j} > Th_2,$$

$$\text{type-3: } \frac{P_S}{\sum_{j=1}^{L-M} P_{I\text{-}inter}^j} > Th_3,$$

where $P_s$ denotes a received signal level from a serving node, L denotes a number of remaining nodes included in an active set other than the serving node, $P_{I\text{-}intra}^j$ denotes a received signal level from a $j^{th}$ internal cell, $P_{I\text{-}inter}^j$ denotes a received signal level from a $j^{th}$ external cell, and $Th_k$ denotes a type-k threshold.

15. The method of claim 13, wherein allocating one or more resources of the second region to at least one type-3 mobile station comprises allocating resources within a predetermined region, which is prohibited from use in a cell neighboring to at least one type-3 mobile station and which is included in the second region, to at least one the type-3 mobile station.

16. The method of claim 13, wherein performing the differentiated scheduling comprises:

configuring a mobile station pool for at least one type-1 mobile station and at least one type-2 mobile station so that at least one remaining mobile station to be scheduled other than at least one grouped mobile station is included in a selection candidate list;

calculating a metric of each mobile station included in the mobile station pool;

selecting a mobile station having a greatest metric and removing at least one mobile station having an interference relation with the selected mobile station; and determining at least one selected mobile station as one group.

17. The method of claim 16, further comprising:

after removing the at least one mobile station having an interference relation with the selected mobile station, repeating at least one of selecting and removing for the remaining mobile stations that are neither selected nor removed until all mobile stations included in the mobile station pool are one of removed and selected; and when all mobile stations included in the mobile station pool are one of removed and selected, determining at least one selected mobile station as one group.

18. The method of claim 16, wherein the metric is calculated according to one of the following equations:

$$SM_k = SINR_k : \text{maximum } SINR \text{ scheme,}$$

$$SM_k(i) = \frac{R_k(i)}{T_k^\alpha(i)} : \text{proportional fairness scheme,}$$

$$T_k(i+1) = \begin{cases} \beta T_k(i): \text{non-scheduled at time } i \\ \beta T_k(i) + (1-\beta)R_k(i): \text{scheduled at time } i, \end{cases}$$

where $SM_k$ denotes a scheduling metric of a $k^{th}$ mobile station, $SINR_k$ denotes a signal to interference and noise ratio (SINR), $T_k(i)$ denotes an average data rate of the $k^{th}$ mobile station at a time i, $\alpha$ denotes a scaling constant, and $\beta$ denotes a forgetting constant.

19. The method of claim 18, wherein the metric is calculated in an initial stage of scheduling in which the mobile stations to be scheduled are determined.

20. The method of claim 16, wherein the metric is calculated by using a scheduling metric of each mobile station according to a corresponding scheduling scheme and by using a reuse matrix (RM) representing an interference relation between the base station and the serving RS.

21. The method of claim 20, wherein the metric is calculated according to:

$$f(SM_k, RM) = SM_k + N_{BS-RS}(RM) \times \sum_{j=1}^{N_{RS-pool}} Avg[SM^j],$$

where $SM_k$ denotes a scheduling metric of a $k^{th}$ mobile station, RM denotes a reuse matrix (RM), $f(\bullet)$ denotes a reuse-based scheduling metric, $N_{BS-RS}$ (RM) denotes an average number of at least one of base stations and RSs that can be additionally selected when the $k^{th}$ mobile station is selected, and $Avg[SM^j]$ denotes an average value of scheduling metrics of mobile stations dependent on $j^{th}$ RS.

22. The method of claim 21, wherein the metric of each mobile station is calculated the each mobile station is selected.

* * * * *